United States Patent
Korte et al.

(10) Patent No.: US 12,227,157 B2
(45) Date of Patent: Feb. 18, 2025

(54) METHODS AND APPARATUS TO EXTEND BRAKE LIFE CYCLE

(71) Applicant: Ford Global Technologies, LLC, Dearborn, MI (US)

(72) Inventors: Chad Michael Korte, Grosse Ile, MI (US); John P. Joyce, West Bloomfield, MI (US); Karl-Peter Hesseler, Siegburg (DE); Thomas Svensson, Leichlingen (DE); Harold John Felch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 362 days.

(21) Appl. No.: 17/492,145

(22) Filed: Oct. 1, 2021

(65) Prior Publication Data

US 2023/0106755 A1    Apr. 6, 2023

(51) Int. Cl.
*B60T 8/172*    (2006.01)
*B60T 1/00*    (2006.01)
(Continued)

(52) U.S. Cl.
CPC .............. *B60T 8/172* (2013.01); *B60T 1/005* (2013.01); *B60T 7/085* (2013.01); *B60T 8/171* (2013.01);
(Continued)

(58) Field of Classification Search
CPC . B60T 1/005; B60T 7/085; B60T 7/12; B60T 8/171; B60T 8/172; B60T 2201/10;
(Continued)

(56) References Cited

U.S. PATENT DOCUMENTS 8,215,725 B2    7/2012    Jackson et al.
9,096,197 B2    8/2015    Hasegawa et al.
(Continued)

FOREIGN PATENT DOCUMENTS

GB    2423803 A  *  9/2006
JP    2006044458 A  *  2/2006
(Continued)

OTHER PUBLICATIONS

Brembo S.p.A., "The New Brembo's Electromechanical Braking System (EPB)," published Sep. 24, 2018, retrieved from [https://www.brembo.com/en/company/news/brembo-electromechanical-braking-system-epb], 3 pages.

*Primary Examiner* — John M Zaleskas
(74) *Attorney, Agent, or Firm* — Lorne Forsythe; Hanley, Flight & Zimmerman, LLC

(57) ABSTRACT

Methods, apparatus, systems, and articles of manufacture to extend brake life cycle are disclosed herein. An example vehicle includes a first brake associated with a first wheel of the vehicle, a second brake associated with a second wheel of the vehicle, memory, and a brake controller to execute instructions to detect a first parking event, determine, via a first sensor, a condition of the vehicle, access, from the memory, a record of a second parking event including an activation of the first brake, the second parking event preceding the first parking event, and in response to determining the condition satisfies a threshold, engage the second brake without engaging the first brake.

20 Claims, 9 Drawing Sheets

(51) Int. Cl.
  *B60T 7/08* (2006.01)
  *B60T 7/12* (2006.01)
  *B60T 8/171* (2006.01)
(52) U.S. Cl.
  CPC ............. *B60T 7/12* (2013.01); *B60T 2210/20* (2013.01); *B60T 2220/00* (2013.01); *B60T 2240/00* (2013.01); *B60T 2250/00* (2013.01)
(58) Field of Classification Search
  CPC ............. B60T 2210/00; B60T 2200/10; B60T 2240/00; B60T 2250/00
  See application file for complete search history.

(56) References Cited

U.S. PATENT DOCUMENTS

| | | | |
|---|---|---|---|
| 2004/0017106 A1* | 1/2004 | Aizawa | B60T 7/12 303/191 |
| 2009/0195058 A1* | 8/2009 | Jackson | B60T 13/683 303/20 |
| 2009/0197738 A1* | 8/2009 | Jackson | B60T 8/1708 477/188 |
| 2009/0198427 A1* | 8/2009 | Christopher Jackson | B60T 17/221 188/1.11 R |
| 2012/0041661 A1* | 2/2012 | Kaneko | B60T 1/062 701/70 |
| 2012/0090928 A1* | 4/2012 | Roll | B60T 7/042 188/106 R |
| 2014/0032073 A1* | 1/2014 | Hasegawa | B60T 7/122 701/70 |
| 2014/0032074 A1* | 1/2014 | Hasegawa | B60T 7/122 701/70 |
| 2014/0032075 A1* | 1/2014 | Hasegawa | B60T 8/172 701/70 |
| 2015/0094925 A1* | 4/2015 | Senoo | B60T 1/005 701/70 |
| 2015/0239445 A1* | 8/2015 | Inoue | B60T 7/22 701/70 |
| 2015/0298665 A1* | 10/2015 | Horii | B60T 8/245 701/70 |
| 2015/0307069 A1* | 10/2015 | Horii | B60T 8/245 701/70 |
| 2017/0037919 A1* | 2/2017 | Nishikawa | F16D 65/18 |
| 2017/0037979 A1 | 2/2017 | Baraccani | |
| 2017/0057477 A1* | 3/2017 | Inoue | B60T 7/22 |
| 2017/0129465 A1* | 5/2017 | Ozawa | B60T 1/062 |
| 2017/0203762 A1* | 7/2017 | Khafagy | B60T 7/122 |
| 2017/0210368 A1* | 7/2017 | Svensson | B60T 8/4072 |
| 2017/0274877 A1* | 9/2017 | Wou | B60T 8/1766 |
| 2017/0305398 A1* | 10/2017 | Ko | B60T 8/3205 |
| 2018/0215355 A1* | 8/2018 | Kinder | B60T 7/12 |
| 2019/0315321 A1* | 10/2019 | Lee | F16H 59/54 |
| 2019/0337495 A1* | 11/2019 | Ernst | B60T 13/74 |
| 2020/0198602 A1* | 6/2020 | Ishii | B60T 1/005 |
| 2021/0237699 A1* | 8/2021 | Boden | B60T 8/26 |
| 2023/0049583 A1* | 2/2023 | Oh | B60T 8/24 |

FOREIGN PATENT DOCUMENTS

| | | | | |
|---|---|---|---|---|
| JP | 2006231954 A | * | 9/2006 | |
| JP | 2006273090 A | * | 10/2006 | |
| JP | 2007181289 A | * | 7/2007 | ............... B60T 8/00 |
| KR | 101382996 | | 4/2014 | |
| KR | 20190088667 A | * | 7/2019 | ............. B60T 13/74 |
| WO | WO-2019054189 A1 | * | 3/2019 | |
| WO | WO-2020235630 A1 | * | 11/2020 | |
| WO | WO-2021125652 A1 | * | 6/2021 | ............... B60T 7/12 |

* cited by examiner

METHODS AND APPARATUS TO EXTEND BRAKE LIFE CYCLE

FIELD OF THE DISCLOSURE

This disclosure relates generally to vehicles and, more particularly, to methods and apparatus to extend brake life cycle.

BACKGROUND

Mechanical parking brake systems are configured such that, when the driver activates (e.g., pulls upward on, etc.) a parking brake lever coupled via a cable to the rear brakes of the vehicle, a braking force is applied to the rear wheels via the rear brakes. In such conventional mechanical parking brake systems, the applied braking force is based on the position of the parking brake lever. Electric parking brake (EPB) systems are configured such that, when the driver activates a parking brake switch, a command (e.g., an electrical signal, a hydraulic signal, etc.) is sent to the brakes of a vehicle, thereby causing a braking force to be applied to the rear wheels. In many conventional EPB systems, independent parking brake actuators are used to mechanical engage the rotors of the rear brakes.

Generally, the holding force applied to the vehicle by mechanical and electric parking brake systems work in tandem with a parking pawl of a vehicle having an automatic transmission. Parking pawls include a mechanical component that prevents/locks rotation of a an output shaft of a transmission, thereby preventing rotation of the wheels of the vehicle. Parking pawls are often activated when the transmission of a vehicle is shifted into park (P).

SUMMARY

An example vehicle disclosed herein includes a first brake associated with a first wheel of the vehicle, a second brake associated with a second wheel of the vehicle, memory, and a brake controller to execute instructions to detect a first parking event, determine, via a first sensor, a condition of the vehicle, access, from the memory, a record of a second parking event including an activation of the first brake, the second parking event preceding the first parking event, and in response to determining the condition satisfies a threshold, engage the second brake without engaging the first brake.

An example non-transitory computer readable medium disclosed herein comprising instructions, which, when executed cause a processor to detect a first parking event of a vehicle, determine, via a first sensor, a condition of the vehicle, access a record of a second parking event including an activation a first brake of the vehicle, the second parking event preceding the first parking event, and in response to determining the condition satisfies a threshold, engage a second brake without engaging the first brake.

An example method disclosed herein includes detecting a first parking event of a vehicle, determining, via a first sensor, a condition of the vehicle, accessing a record of a second parking event including an activation a first brake of the vehicle, the second parking event preceding the first parking event, and in response to determining the condition satisfies a threshold, engaging a second brake without engaging the first brake.

Figure 1:
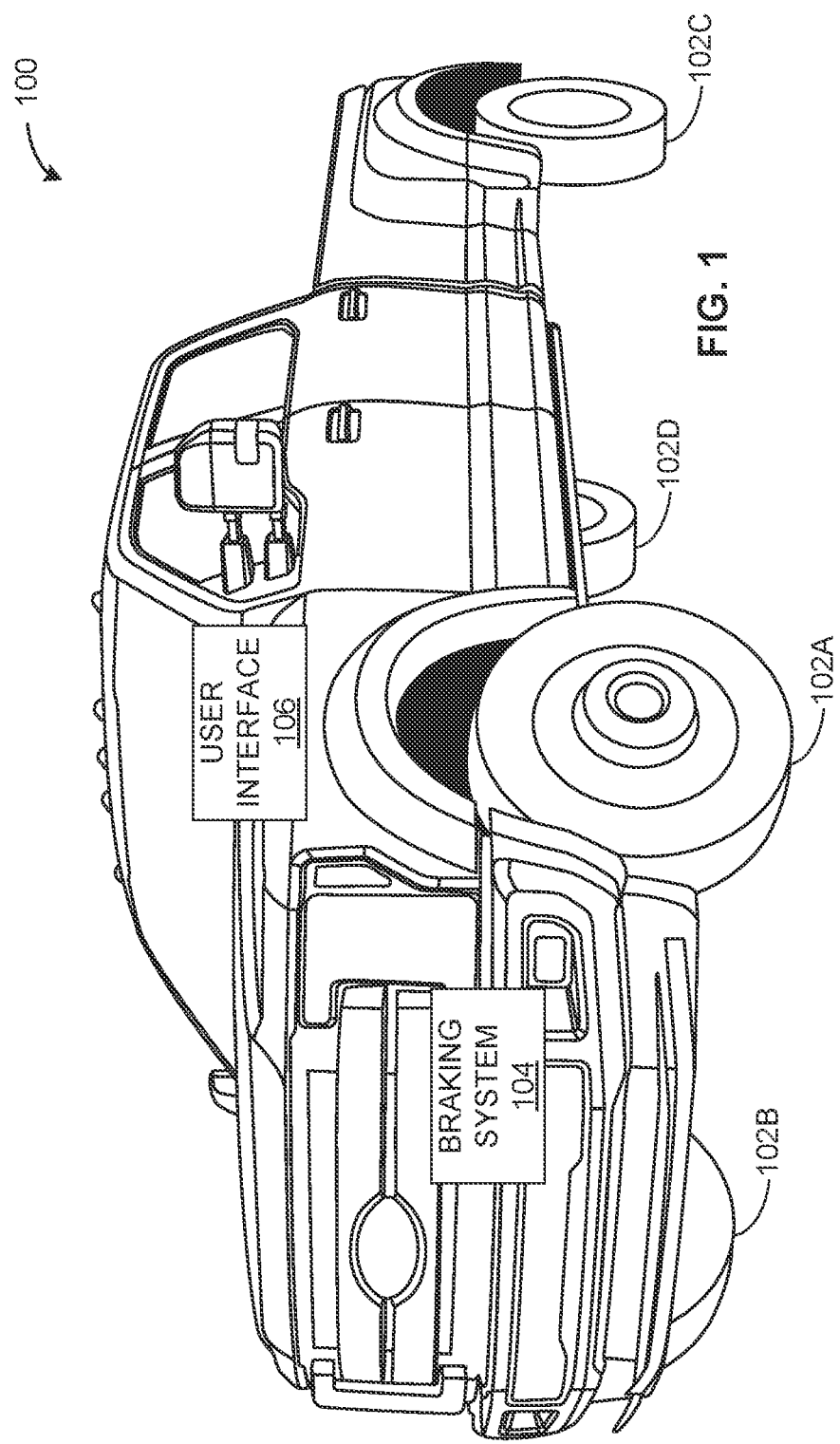
FIG. 1 is a perspective view of a vehicle in which examples disclosed herein can be implemented.

The figures are not to scale. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

DETAILED DESCRIPTION

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

As used herein, the orientation of features is described with reference to a lateral axis, a vertical axis, and a longitudinal axis of the vehicle associated with the features. As used herein, the longitudinal axis of the vehicle is parallel to a centerline of the vehicle. The terms "rear" and "front" are used to refer to directions along the longitudinal axis closer to the rear of the vehicle and the front of the vehicle, respectively. As used herein, the vertical axis of the vehicle is perpendicular to the ground on which the vehicle rests. The terms "below" and "above" are used to refer to directions along the vertical axis closer to the ground and away from the ground, respectively. As used herein, the lateral axis of the vehicle is perpendicular to the longitudinal and vertical axes and is generally parallel to the axles of the vehicle. As used herein, the terms "longitudinal," and "axial" are used interchangeably to refer to directions parallel to the longitudinal axis. As used herein, the terms "lateral" and "horizontal" are used to refer to directions parallel to the lateral axis. As used herein, the term "vertical" is used interchangeably to refer to directions parallel to the vertical axis.

As used herein, the term "parking event" refers to an event in which a vehicle transitions from a mobile mode to a stationary mode. For example, a parking event can be manually triggered by a user (e.g. by shifting the vehicle into park (P), by engaging a parking brake of the vehicle, by turning a vehicle off, etc.). In other examples, a parking event can be initiated without user input by a triggering event (e.g., inactiveness of the vehicle, after completing a self-driving command, etc.).

Parking pawls are safety features of a vehicle that prevents/locks rotation of a output shaft of a vehicle transmission when activated by a user of the vehicle. Generally, parking pawls are designed to have long duty cycles (e.g., part endurance, part lifespan, part life cycle, etc.). The holding force provided by the parking pawl can be used in tandem with the parking brake system of a vehicle. While the manufacture, assembly, and installation of parking pawls can be less efficient than the incorporation of electric parking brake components, the lifecycle of electric parking brake components (e.g., parking brake actuators, etc.) is often substantially less than that of a parking pawl. As such, exclusive use of the EPB system to hold a parked vehicle could significantly increase the service requirements of a vehicle to replace worn components of the EPB system.

Examples disclosed herein overcome the above-noted deficiencies by enabling the removal of a parking pawl from a vehicle while maintaining the long lifecycle of EPB components. Examples disclosed herein facilitate the activation of a single parking brake of the EPB system in situations where one parking brake is sufficient to hold the parked vehicle. In some examples disclosed herein, the previously activated parking brake of the system is determined (e.g., one of the rear passenger parking brake or the rear driver parking brake, etc.). In some such examples disclosed herein, the alternate one of the parking brakes is activated the next time the vehicle is parked. In some examples disclosed herein, the wheels are monitored to ensure that, in response to rotation of a wheel while the vehicle is parked, both of the parking brakes can be activated. In some examples disclosed herein, the holding force required by the EPB system is estimated based on a condition of the vehicle. In some such examples disclosed herein, after the estimated holding force that is applied to the vehicle by one of the EPB brakes, an additional holding force margin is applied to ensure the vehicle remains stationary. In some examples disclosed herein, the vehicle condition is used to determine if one of the EPB brakes can be used to hold the vehicle. In some such examples disclosed herein, if the vehicle condition does not allow activation of a single brake of the EPB system, both brakes of the EPB system are activated.

In other examples disclosed herein, the temperature of the brake rotors and/or wheels can be monitored. In some such examples disclosed herein, if the temperature of the wheels and rotors exceeds a temperature threshold, the operation of a parking brake can be alternated between sides of the vehicle. In some examples disclosed herein, the alternation of the EPB brakes can prevent warping of the rotor caused by activation of the EPB system on hot brake rotors.

FIG. 1 is a perspective view of a vehicle in which examples disclosed herein can be implemented. In the illustrated example of FIG. 1, the vehicle 100 includes an example first wheel 102A, an example second wheel 102B, an example third wheel 102C, and an example fourth wheel 102D. In the illustrated example of FIG. 1, the vehicle 100 includes an example braking system 104 and an example user interface 106.

The vehicle 100 is a motorized wheel-driven vehicle. In the illustrated example of FIG. 1, the vehicle 100 is a pick-up truck. In other examples, the vehicle 100 can be any type of vehicle with brakes (e.g., a sedan, a coupe, a van, a pick-up truck, a sports utility vehicle, an all-terrain vehicle (ATV), farming equipment, etc.). In some examples, the vehicle 100 includes an internal combustion engine (e.g., a non-electrified vehicle, a partially electrified vehicle, etc.). In other examples, the vehicle 100 can be implemented as a fully electric vehicle.

The wheels 102A, 102B, 102C, 102D include a wheel rim and a corresponding tire. While in the illustrated example of FIG. 1, the vehicle 100 has two axles and four wheels, in other examples, the vehicle 100 can have any number of axles and wheels. In the illustrated example of FIG. 1, the first wheel 102A and the second wheel 102B are front wheels and the third wheel 102C and the fourth wheel 102D are rear wheels. In the illustrated example of FIG. 1, the first wheel 102A and the third wheel 102C are driver-side wheels and the second wheel 102B and the fourth wheel 102D are passenger-side wheels.

The braking system 104 includes mechanical components that retard the rotation of the wheels 102A, 102B, 102C, 102D. The braking system 104 can receive a user input (e.g., via the user interface 106, etc.) and cause activation of one or more brake(s) of the braking system 104. While the braking system 104 is described herein as a disc brake system, the examples described herein can also be applied to any other suitable type of braking system (e.g., a drum brake system, a dual disc-drum brake system, a clasp brake system, band brake systems, electromagnetic brakes, etc.). Similarly, while the braking system 104 described herein is a brake-by-wire system, the examples described herein can also be applied to hydraulic and/or hybrid braking system. Similarly, while the braking system 104 is described as having a shared mechanical mechanism (e.g., a caliper and rotor, etc.) for both the service and parking brakes, in other examples, the braking system 104 can have separate mechanisms for the service brakes and parking brakes. An example implementation of the braking system 104 is described in greater detail below in FIG. 2.

The user interface 106 enables a user of the vehicle 100 to receive from the user and input information to the braking system 104 and other systems of the vehicle 100. For example, the user interface 106 can include a display of the vehicle 100. In some examples, the user interface 106 can include an interface to operate the braking system 104 during operation of the vehicle 100 (e.g., a brake pedal, a hand brake, etc.). In some examples, the user interface 106 can receive an instruction from a user of the vehicle 100 to park (e.g., initiate a parking event, etc.). In some such examples, the user interface 106 can include a transmission interface including a park (P) position (e.g., a shifter, a gear stick, gear selector, etc.), a parking brake mechanical interface (e.g., a handle, a lever, a peddle, etc.) and/or a button that operates that EPB system. Additionally or alternatively, the user interface 106 can include one or more dash indicator(s), one or more button(s) on the dashboard or steering wheel, one or more speakers, one or more microphones, etc. In some examples, the user interface 106 can be fully or partially implemented by a mobile device of the user (e.g., a mobile phone, a smartwatch, a tablet, etc.).

Figure 2:
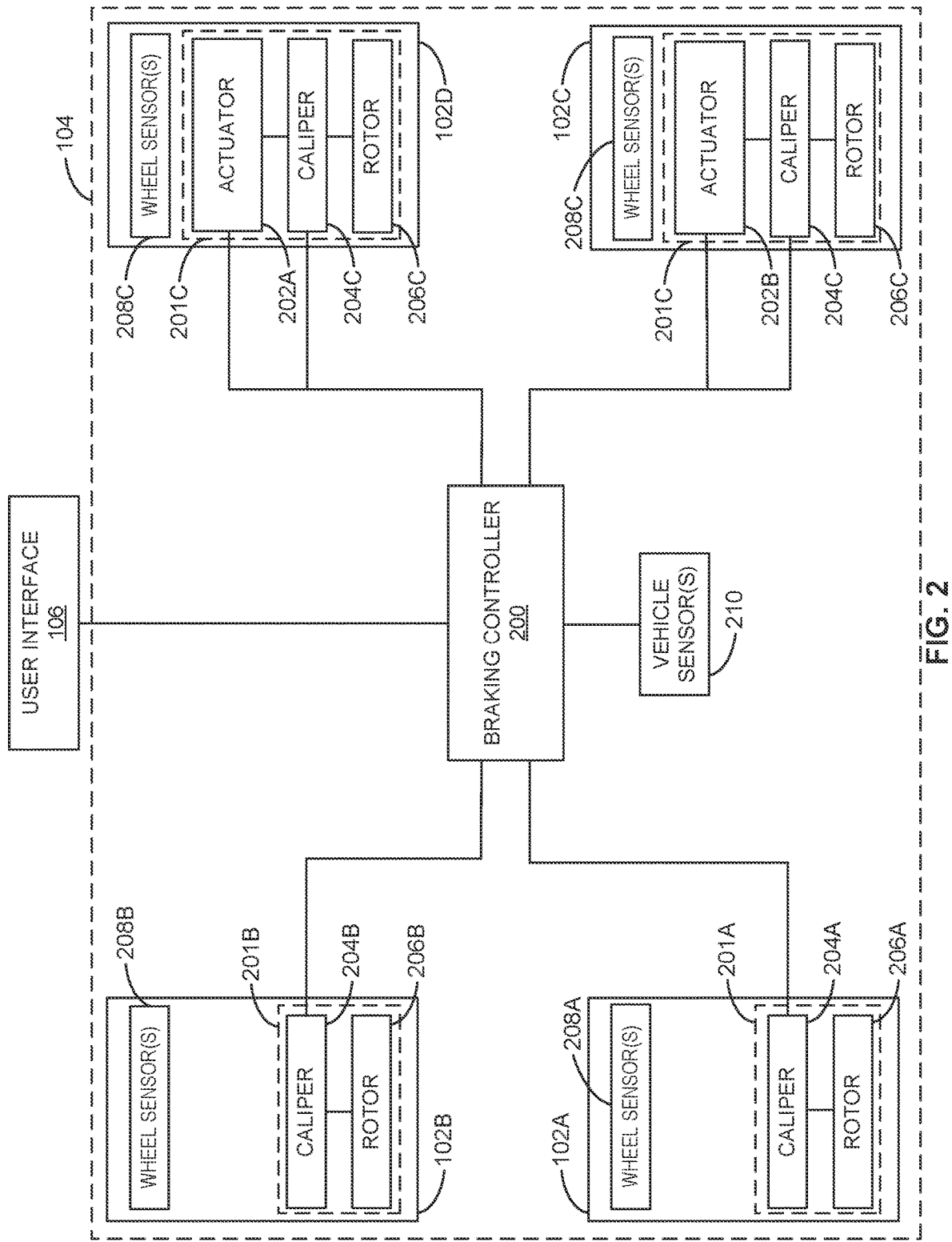
FIG. 2 is a system diagram of the EPB system of FIG. 1.

FIG. 2 is a system diagram of the braking system 104 of FIG. 1. In the illustrated example of FIG. 2, the braking system 104 includes an example braking controller 200. In the illustrated example of FIG. 2, the braking system 104 includes an example first brake 201A, an example second brake 201B, an example third brake 201C, and an example fourth brake 201D, which are associated with the first wheel 102A, the second wheel 102B, the third wheel 102C, and the fourth wheel 102D, respectively. In the illustrated example of FIG. 2, the third brake 201C and the fourth brake 201D include an example first actuator 202A, and an example second actuator 202B, respectively. In the illustrated example of FIG. 2, the brakes 201A, 201B, 201C, 201D include an example first caliper 204A, an example second caliper 204B, an example third caliper 204C, and an example fourth caliper 204D, respectively. In the illustrated example of FIG. 2, the brakes 201A, 201B, 201C, 201D include an example first rotor 206A, an example second rotor 206B, an example third rotor 206C, and an example fourth rotor 206D, respectively. In the illustrated example of FIG. 2, the braking system 104 includes example first wheel sensors 208A, example second wheel sensors 208B, example third wheel sensors 208C, example fourth wheel sensors 208D, which are associated with the wheels 102A, 102B, 102C, 102D, respectively, and example vehicle sensors 210.

The braking controller 200 controls the service brake components and parking brake components of the vehicle 100. For example, the braking controller 200 can cause the calipers 204A, 204B, 204C, 204D to engage the corresponding one of the rotors 206A, 206B, 206C, 206D during operation of the vehicle (e.g., to bring the vehicle 100 from a velocity to a stop, to hold the vehicle, etc.). The braking controller 200 can similarly activate one or both of the actuators 202A, 202B to hold the vehicle 100 after detecting a parking event. As used herein, the terms "activated" and "operated" are used interchangeably to refer to the use of the actuators 202A, 202B to engage the corresponding ones of the brakes 201A, 201B. In some such examples, the braking controller 200 can determine if a single one of the actuators 202A, 202B can be activated (e.g., operated, etc.) based on user inputs (e.g., user preferences, etc.) and the condition of the vehicle 100. In some such examples, the braking controller 200 can determine which of the actuators 202A, 202B to activate based on a previously used one of the actuators 202A, 202B. For example, if the brake controller 200 determines the actuator used in the previous parking event was the first actuator 202A, the braking controller 200 can cause the second actuator 202B to activate in the next parking event, thereby engaging one of the rear brakes 201C, 201D without engaging the other one of the rear brakes 201C, 201D.

In some examples, the braking controller 200 communicates with the calipers 204A, 204B, 204C, 204D and/or the actuators 202A, 202B via a controller area network (CAN) bus of the vehicle 100. Additionally or alternatively, the braking controller 200 can communicate with the calipers 204A, 204B, 204C, 204D and/or the actuators 202A, 202B via an independent communication system (e.g., an electrical communication system, a hydraulic communication system, etc.). The braking controller 200 can be implemented by an electronic control unit of the vehicle 100 (e.g., a dedicated brake control module (BCM), one or more vehicle control module(s) (VCM), one or more domain controller(s), etc.). In other examples, some or all of the components of the braking controller 200 can be implemented by one or more other system(s) of the vehicle 100 (e.g., the anti-lock braking system (ABS), the electronic stability system (ESC), a powertrain controller, a transmission controller, etc.).

The actuators 202A, 202B are components of the EPB system of the vehicle 100 that apply holding force to the rear wheels 102C, 102D, respectively, when the vehicle 100 is parked. In the illustrated example, the actuators 202A, 202B apply constant pressure to the rotors 206C, 206D via the calipers 204C, 204D, respectively. In other examples, the actuators 202A, 202B can function independently of the calipers 204C, 204D. In some such examples, the actuators 202A, 202B can directly interact with the rotors 206C, 206D and/or another component of the wheels 102C, 102D, respectively. In some examples, the actuators 202A, 202B include an electric motor, a gearbox, and a piston. In some such examples, the electric motor applies a torque to the gearbox, which in turn applies a force to a respective one of the calipers 204C, 204D via the pistons, thereby applying a holding force to the wheels 102C, 102D. In other examples, the actuators 202A, 202B can include any other suitable mechanical components to apply a constant holding force while the vehicle 100 is parked. In the illustrated example of FIG. 2, the actuators 202A, 202B are associated with the wheels 102C, 102D (e.g., the rear wheels, etc.), respectively. In other examples, the actuators 202A, 202B can be associated with the wheels 102A, 102B (e.g., the front wheels, etc.). In other examples, each of the wheels 102A, 102B, 102C, 102D can have an associated actuator of the EPB system.

The calipers 204A, 204B, 204C, 204D are mechanical components that receive inputs from the braking controller 200. After receiving an input (e.g., a braking signal, etc.) from the braking controller 200, the calipers 204A, 204B, 204C, 204D apply a clamping pressure (e.g., via one or more pistons, etc.) to a respective one of the rotors 206A, 206B, 206C, 206D, thereby slowing rotation of the corresponding one of the wheels 102A, 102B, 102C, 102D. In some examples, the contact surfaces of the calipers 204A, 204B, 204C, 204D with the rotors 206A, 206B, 206C, 206D include brake pads.

The rotors 206A, 206B, 206C, 206D are discs that are connected to the wheels 102A, 102B, 102C, 102D, respectively. The rotors 206A, 206B, 206C, 206D are rigidly connected to and rotate with the wheels 102A, 102B, 102C, 102D. During operation of the brakes 201A, 201B, 201C, 201D, the calipers 204A, 204B, 204C, 204D press upon and apply a frictional force to the rotors 206A, 206B, 206C, 206D, thereby slowing the rotation of the corresponding one of the wheels 102A, 102B, 102C, 102D. The rotors 206A, 206B, 206C, 206D can have any suitable shape (e.g., circular, etc.) and any suitable features (e.g., slots, holes, etc.).

The wheel sensors 208A, 208B, 208C, 208D are sensors associated with the respective ones of the wheels 102A, 102B, 102C, 102D to measure characteristics associated with the wheels 102A, 102B, 102C, 102D. For example, the wheel sensors 208A, 208B, 208C, 208D can include temperature sensors (e.g., thermometers, etc.) that determine the temperature of the brakes 201A, 201B, 201C, 201D and/or any other component associated with the wheels 102A, 102B, 102C, 102D. In some examples, the wheel sensors 208A, 208B, 208C, 208D can measure the rotational speed of the wheels 102A, 102B, 102C, 102D. For example, the wheel sensors 208A, 208B, 208C, 208D can include one or more tachometers, optical sensors, a hall-effect sensor, etc. Additionally or alternatively, the wheel sensors 208A, 208B, 208C, 208D can include any suitable other sensors.

The vehicle sensors 210 measure the properties of the vehicle 100. In the illustrated example of FIG. 2, the vehicle sensor 210 includes a grade sensor (e.g., an accelerometer, an optical sensor, a mechanical sensor, etc.). In other examples, the vehicle sensors 210 can include any suitable sensors. In some examples, the vehicle sensors 210 can be part of another system of the vehicle 100 (e.g., a safety system of the vehicle 100, etc.).

During normal service of the vehicle 100, operation of the brakes 201A, 201B, 201C, 201D is controlled via the user interface 106 and the braking controller 200. For example, the braking controller 200 can receive user inputs (e.g., depression of a brake pedal, etc.). In some examples, the braking controller 200 causes engagement of the first brake 201A by communicating (e.g., via a wired connection, via a wireless connection, etc.) with the first caliper 204A to press corresponding brake pad(s) (not illustrated) against the first rotor 206A. The resulting friction between the brake pad(s) and the first rotor 206A slows (e.g., decelerates, stops, etc.) the rotation of the first wheel 102A. Additionally or alternatively, the other wheels 102B, 102C, 102D, and corresponding ones of the brakes 201B, 201C, 201D can be similarly engaged by the braking controller 200 via the user interface 106.

When the braking controller 200 detects a parking event, one or more of the brakes 201C, 201D (e.g., the brakes associated with the rear wheels 102A, 102B, etc.) is engaged by the braking controller 200 to provide a holding force to the vehicle 100 to retain the vehicle 100 while the vehicle 100 is parked. In some such examples, the braking controller 200 can activate one or more of the actuators 202A, 202B to provide a holding force to the vehicle 100. In some examples, when the vehicle condition enables the activation of a single one of the actuators 202A, 202B (e.g., the vehicle 100 is on a mild grade, the vehicle 100 is on a flat driving surface, the brakes 201A, 201B, 201C, 201D are below a temperature threshold, etc.), the braking controller 200 can determine which of the actuators 202A, 202B was activated during the immediately preceding parking event. In some such examples, the braking controller 200 can activate the other one of actuators 202A, 202B to engage the corresponding one of the brakes 201A, 201B to apply a holding force during the current parking event. In other examples, if the brakes 201A, 201B, 201C, 201D exceed a temperature threshold, the braking controller 200 can alternate activation of the actuators 202A, 202B to mitigate potential warping of the rotors 206C, 206D.

Figure 3:
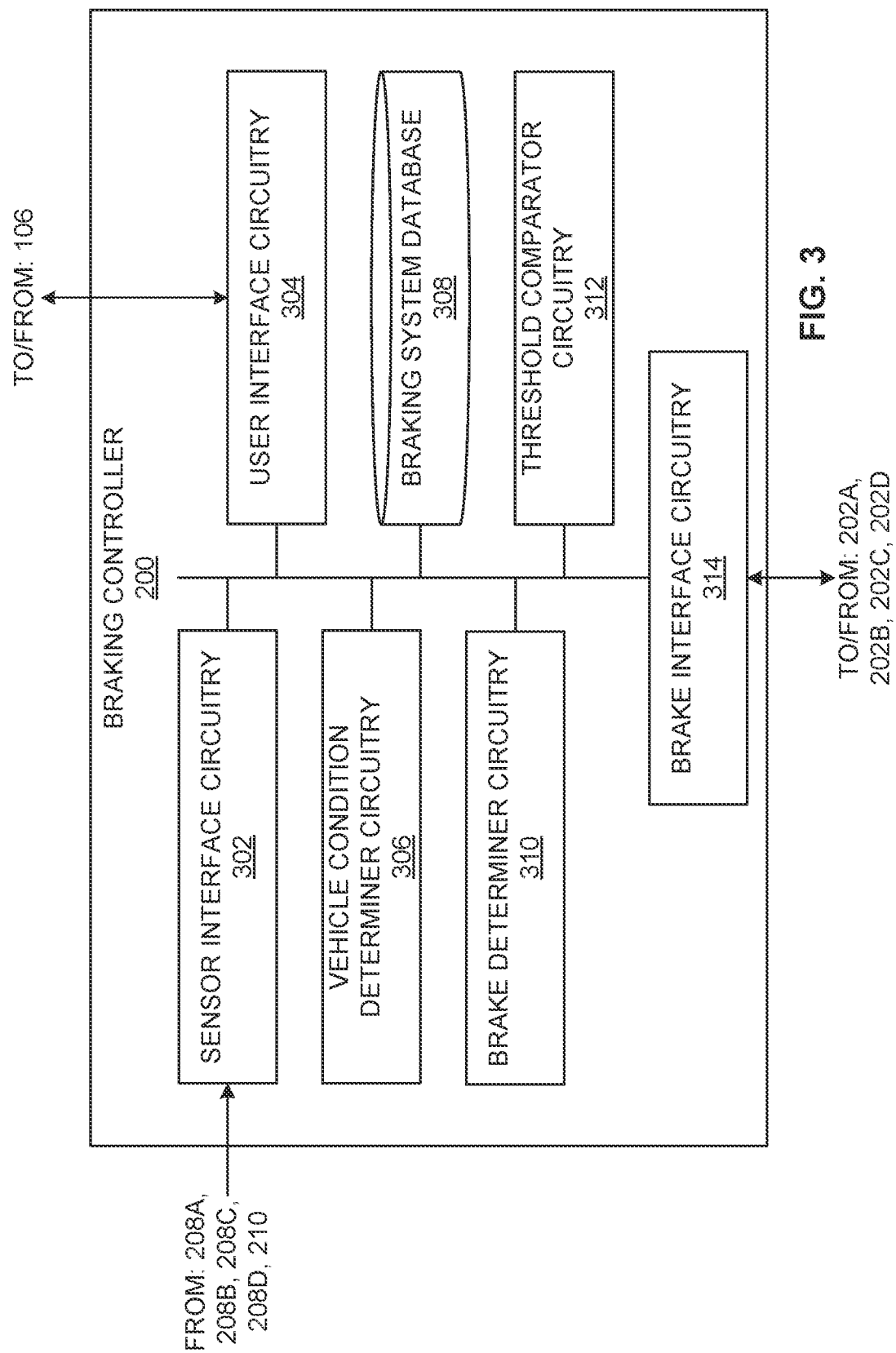
FIG. 3 is a block diagram of the braking controller of FIG. 2.

FIG. 3 is a block diagram of the braking controller 200 of FIG. 2. In the illustrated example of FIG. 3, the braking controller 200 includes example sensor interface circuitry 302, example user interface circuitry 304, example vehicle condition determiner circuitry 306, an example braking system database 308, example brake determiner circuitry 310, example threshold comparator circuitry 312, and example brake interface circuitry 314.

The sensor interface circuitry 302 receives sensor data from the sensors 208A, 208B, 208C, 208D, 210 of the example vehicle 100 and/or braking system 104. In some examples, the sensor interface circuitry 302 can transform the received sensor data from a machine-readable format (e.g., a voltage, a current, etc.) to a human-readable format (e.g., a string, a floating-point number, an integer, etc.).

The user interface circuitry 304 receives inputs from the user interface 106 of FIG. 1. For example, the user interface circuitry 304 can receive an indication to operate the brakes during service operation of the vehicle (e.g., instructions to cause the engagement of the calipers 204A, 204B, 204C, 204D to the rotors 206A, 206B, 206C, 206D, etc.). The user interface circuitry 304 detects a user of the vehicle 100 has caused a parking event (e.g., by shifting the vehicle into park, by engaging the parking brake, etc.). In some examples, the user interface circuitry 304 can receive inputs from the user interface 106 regarding user preferences. For example, the user interface circuitry 304 can receive a user input regarding a preference to engage both brakes 201C, 201D (e.g., activate both actuators 202A, 202B, etc.) while parked or a preference to minimize use/wear of the brakes 201C, 201D (e.g., minimize use/wear of the actuators 202A, 202B, the calipers 204C, 204D, the rotors 206C, 206D, etc.) by activating one of the actuators 202A, 202B without activating the other one of the actuators 202A, 202B when permittable by the vehicle condition.

The vehicle condition determiner circuitry 306 determines the condition of the vehicle 100 based on sensor data received from the sensors 208A, 208B, 208C, 208D, 210. For example, the vehicle condition determiner circuitry 306 can determine the grade of a driving surface on which the vehicle 100 is disposed based on readings from the vehicle sensors 210 (e.g., accelerometer data, etc.). In some examples, the vehicle condition determiner circuitry 306 can output a binary value indicating whether it is permittable to use a single one of the actuators 202A, 202B to hold the vehicle 100 while parked. In other examples, the vehicle condition determiner circuitry 306 can output a value (e.g., an integer, a floating-point value, a string, etc.) indicative of the feasibility of using a single one of the actuators 202A, 202B to hold the vehicle 100 while parked. In some such examples, the output value of the vehicle condition determiner circuitry 306 (e.g., by the brake determiner circuitry 310, etc.) can be compared to a user preference (e.g., a user-set threshold) to determine if a single actuator of the actuators 202A, 202B is to be activated during the parking event. Example functions of the vehicle condition determiner circuitry 306 are described below in conjunction with FIGS. 4A-4C.

The braking system database 308 stores information regarding the operation of the braking system 104. For example, the braking system database 308 can store information regarding the lifecycle of the brakes 201A, 201B, 201C, 201D (e.g., the calipers 204A, 204B, 204C, 204D, the actuators 202A, 202B, etc.). In some examples, the braking system database 308 can store records of previous parking events. For example, the braking system database 308 can store records of which of the actuators 202A, 202B were activated during previous parking events and when the previous parking events occurred.

The brake determiner circuitry 310 determines which of the actuators 202A, 202B to activate in response to a parking event (e.g., as detected/received via the user interface circuitry 304, etc.). For example, the brake determiner circuitry 310 can determine if to activate the first actuator 202A, the second actuator 202B, or both actuators 202A, 202B (e.g., to engage one or more corresponding ones of the brakes 201C, 201D, etc.) to hold a vehicle 100 in response to a parking event. In some examples, the brake determiner circuitry 310 can determine a holding force to be applied by the selected one(s) of the actuators 202A, 202B based on the determined vehicle condition. In some such examples, the brake determiner circuitry 310 can increase the determined holding force by a predetermined amount (e.g., user-set, manufacturer-set, etc.). In some examples, the brake determiner circuitry 310 can determine which of actuators 202A, 202B to activate based on an output of the vehicle condition determiner circuitry 306 and/or a user preference (e.g., received from the user interface circuitry 304, stored in the braking system database 308, etc.). In some examples, the brake determiner circuitry 310 can, in response to data from the wheel sensors 208A, 208B, 208C, 208D indicating one or more of the wheels 102A, 102B, 102C, 102D is rotating after an initial holding force was applied during a parking event, the brake determiner circuitry 310 can activate an additional one of the actuators 202A, 202B and/or increase the holding force applied by one or more of the actuators 202A, 202B.

The threshold comparator circuitry 312 compares the temperature of the brakes 201A, 201B, 201C, 201D to a temperature threshold. For example, the threshold comparator circuitry 312 can determine if the temperature of one or more of the brakes 201A, 201B, 201C, 201D satisfies a temperature threshold. In some such examples, if the temperature of one or more of the brakes 201A, 201B, 201C, 201D does satisfy the temperature threshold, the threshold comparator circuitry 312 can, via the brake determiner circuitry 310 and/or the brake interface circuitry 314, cause deactivation of an activated one of the actuators 202A, 202B and an activation of a deactivated one of the actuators 202A, 202B. In some such examples, the threshold comparator circuitry 312 can cause the alternation of activation of the actuators 202A, 202B until some or all of the brakes 201A, 201B, 201C, 201D no longer satisfy the temperature threshold. In some examples, the temperature threshold can be based on a caliper/rotor temperature at which activation of the calipers 204A, 204B, 204C, 204D could cause the rotors 206A, 206B, 206C, 206D to warp. In other examples, the temperature threshold can be based on any other suitable criteria.

The brake interface circuitry 314 interfaces with the brakes 201A, 201B, 201C, 201D to cause the activation of the calipers 204A, 204B, 204C, 204D and/or the actuators 202A, 202B. In some examples, the brake interface circuitry 314 can cause the activation and/or deactivation of the actuators 202A, 202B in response to instructions from the user interface circuitry 304, brake determiner circuitry 310, and/or the threshold comparator circuitry 312. In some examples, the brake interface circuitry 314 can provide feedback information from the brakes 201A, 201B, 201C, 201D to the other components of the braking controller 200 of FIG. 3.

While an example manner of implementing the brake controller 200 of FIG. 2 is illustrated in FIG. 3, one or more of the elements, processes, and/or devices illustrated in FIG. 3 may be combined, divided, re-arranged, omitted, eliminated, and/or implemented in any other way. Further the example sensor interface circuitry 302, the example user interface circuitry 304, the example vehicle condition determiner circuitry 306, the example braking system database 308, the example brake determiner circuitry 310, the example threshold comparator circuitry 312, the example brake interface circuitry 314, and/or, more generally, the example brake controller 200 of FIGS. 2 and 3 may be implemented by hardware, software, firmware, and/or any combination of hardware, software, and/or firmware. Thus, for example, any of the example sensor interface circuitry 302, the example user interface circuitry 304, the example vehicle condition determiner circuitry 306, the example braking system database 308, the example brake determiner circuitry 310, the example threshold comparator circuitry 312, the example brake interface circuitry 314, and/or, more generally, the example brake controller 200 of FIG. 3, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example sensor interface circuitry 302, the example user interface circuitry 304, the example vehicle condition determiner circuitry 306, the example braking system database 308, the example brake determiner circuitry 310, the example threshold comparator circuitry 312, the example brake interface circuitry 314 is/are hereby expressly defined to include a non-transitory computer readable storage device or storage disk such as a memory, a digital versatile disk (DVD), a compact disk (CD), a Blu-ray disk, etc., including the software and/or firmware. Further still, the example brake controller 200 of FIG. 3 may include one or more elements, processes, and/or devices in addition to, or instead of, those illustrated in FIG. 3, and/or may include more than one of any or all of the illustrated elements, processes and devices.

Figure 4A:
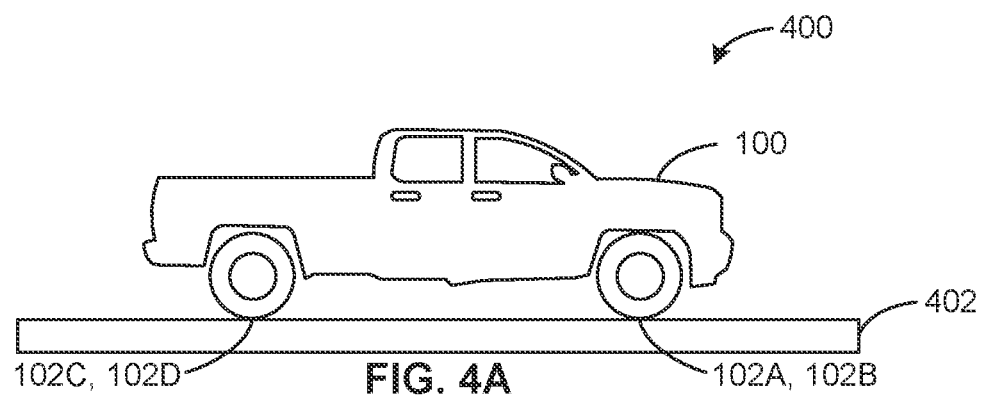
FIGS. 4A-4C are simplified illustrations of the vehicle of FIG. 1 on driving surfaces of different grades.

FIG. 4A is a simplified illustration of the vehicle 100 of FIG. 1 in an example first vehicle condition 400. In the illustrated example of FIG. 4A, the vehicle 100 is resting on an example first driving surface 402. In the illustrated example of FIG. 4A, the flat grade of the first driving surface 402 does not require additional holding force to prevent the vehicle from moving. As such, in some examples, the vehicle condition determiner circuitry 306 can determine that the first vehicle condition 400 permits the activation of a single actuator (e.g., one of the actuators 202A, 202B, etc.). In some such examples, the braking controller 200 can determine a previously activated one of the actuators and cause the activation of the other one of the actuators. In other examples, other aspects of the first vehicle condition 400 (e.g., a temperature of the wheels 102A, 102B, 102C, 102D, a low friction coefficient of the first driving surface 402, high winds on the vehicle 100, etc.) can cause the vehicle condition determiner circuitry 306 to determine the activation of both actuators (e.g., the actuators 202A, 202B of FIG. 2, etc.) is required to hold the vehicle 100. In other examples, a user preference can cause both actuators (e.g., the actuators 202A, 202B of FIG. 2, etc.) to be activated.

Figure 4B:
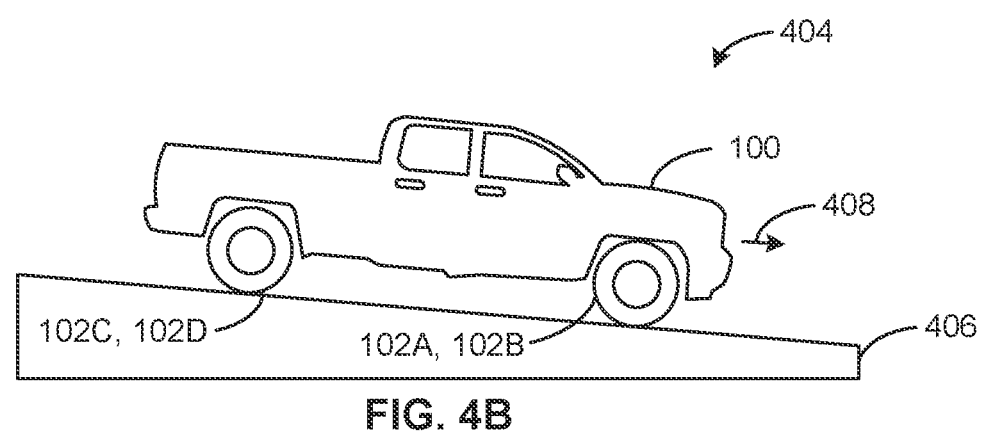

FIG. 4B is a simplified illustration of the vehicle 100 of FIG. 1 in an example second vehicle condition 404. In the illustrated, the vehicle 100 is resting on an example second driving surface 406 and is under an example first gravitational force 408 along the grade of the second driving surface 406. In the illustrated example of FIG. 4B, the grade of the second driving surface 406 requires additional holding force to be applied to the vehicle 100 to compensate for the first gravitational force 408. In some examples, the vehicle condition determiner circuitry 306 can compare the total required holding force to hold the vehicle 100 (e.g., the sum of the first gravitational force 408, the base holding force, and a safety margin, etc.) and compare it to the holding force provided by the activation of a single actuator of the parking brake system of the vehicle 100. In the illustrated example of FIG. 4B, the comparatively mild grade of the second driving surface 406 causes the second vehicle condition 404 to permit the activation of a single actuator (e.g., one of the actuators 202A, 202B, etc.). In some such examples, the braking controller 200 can determine a previously activated one of the actuators and cause the activation of the other one of the actuators. In other examples, other aspects of the second vehicle condition 404 (e.g., a temperature of the wheels 102A, 102B, 102C, 102D, a low friction coefficient of the second driving surface 406, high winds on the vehicle 100, etc.) can cause the vehicle condition determiner circuitry 306 to determine the activation of both actuators (e.g., the actuators 202A, 202B of FIG. 2, etc.) is required to hold the vehicle 100. In other examples, a user preference can cause both actuators (e.g., the actuators 202A, 202B of FIG. 2, etc.) to be activated.

In the illustrated example of FIGS. 4A and 4B, if a single actuator is used to hold the vehicle 100, the braking controller 200 can cause the other actuator to be activated after the vehicle 100 has been parked. For example, if the rotation of one of the wheels 102A, 102B, 102C, 102D is detected (e.g., by the wheels sensors 208A, 208B, 208C, 208D, etc.), the braking controller 200 can automatically cause the other actuator to be activated.

Figure 4C:
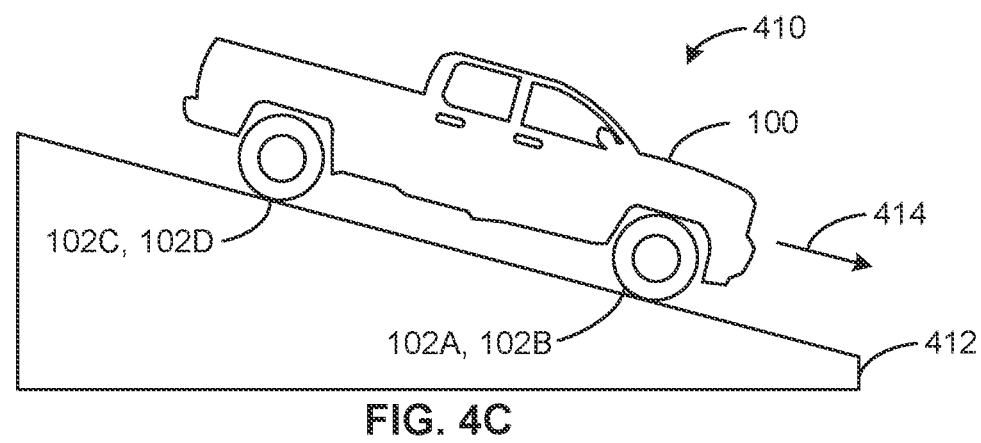

FIG. 4C is a simplified illustration of the vehicle 100 of FIG. 1 in an example third vehicle condition 410. In the illustrated, the vehicle 100 is resting on an example second third driving surface 412 and is under an example second gravitational force 414 along the grade of the third driving surface 412. Like the illustrated example of FIG. 4B, the grade of the third driving surface 412 requires additional holding force to be applied to the vehicle 100 to compensate for the second gravitational force 414. However, unlike the second vehicle condition 404 of FIG. 4B, the comparatively higher grade of the third driving surface 412 causes the vehicle condition determiner circuitry 306 to determine the activation of both actuators of the vehicle 100 (e.g., the actuators 202A, 202B of FIG. 2, etc.) is required to compensate for the second gravitational force 414. As such, in the illustrated example of FIG. 4C, the vehicle condition determiner circuitry 306 will determine the activation of both actuators of the vehicle 100 is required, regardless of user preferences and other aspects of the vehicle condition 410.

Figure 5:
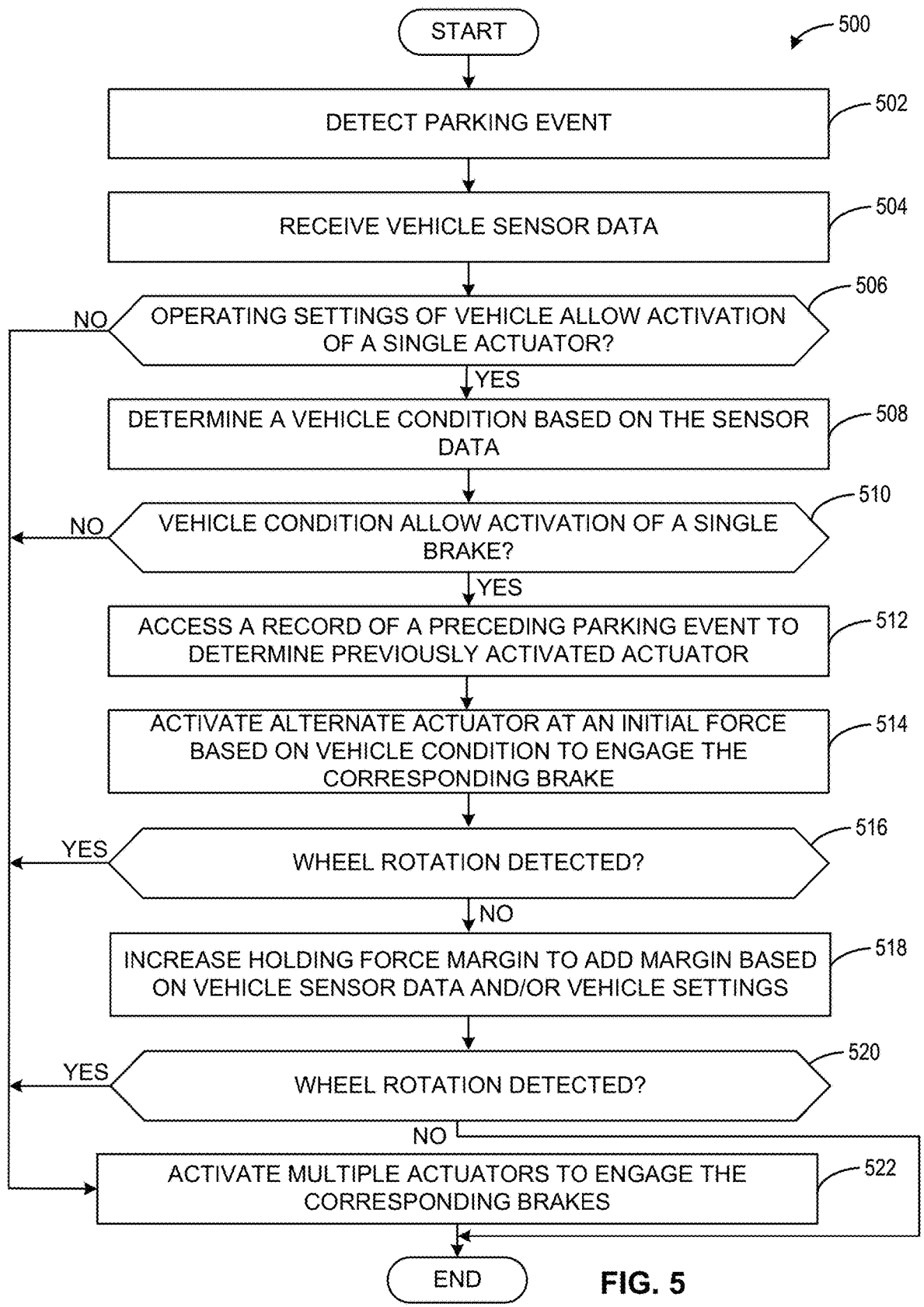
FIGS. 5-6 are flowcharts representative of example machine readable instructions that may be executed by example processor circuitry to implement the braking controller of 2 and 3.
Figure 6:
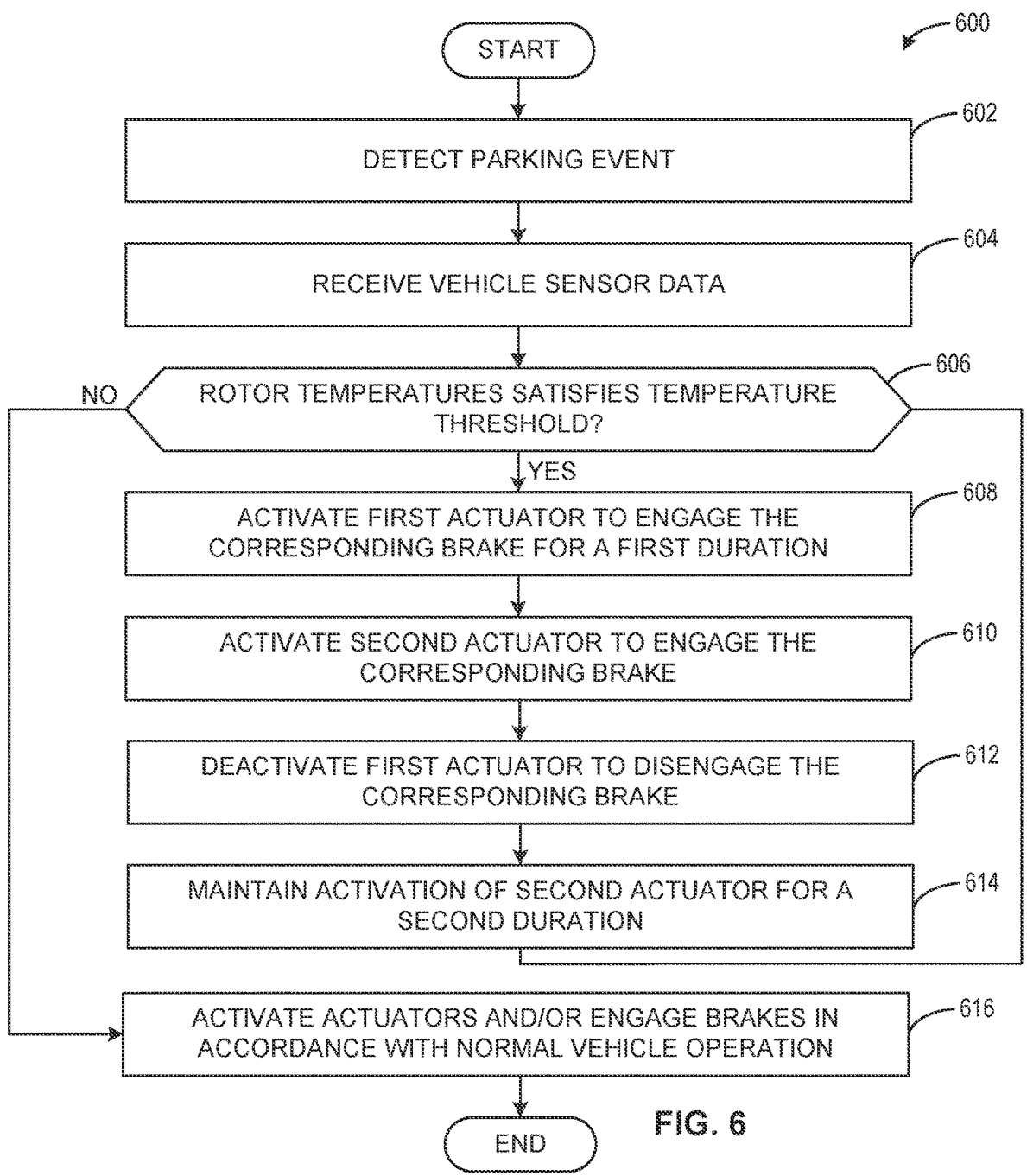

Flowcharts representative of example hardware logic circuitry, machine readable instructions, hardware implemented state machines, and/or any combination thereof for implementing the braking controller 200 of FIGS. 2 and 3 are shown in FIGS. 5 and 6. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example programs are described with reference to the flowchart illustrated in FIGS. 5 and 6, many other methods of implementing the example braking controller 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5 and 6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5 is a flowchart representative of example machine readable instructions and/or example operations 500 that may be executed and/or instantiated by processor circuitry to implement the braking controller 200 to increase the life-cycle of the braking system 104. The machine readable instructions and/or operations 500 of FIG. 5 begin at block 502, at which the user interface circuitry 304 detects a parking event. For example, the user interface circuitry 304 can detect a parking event based on a user input to the user interface 106. For example, the user interface circuitry 304 can detect a parking event triggered by a user shifting the vehicle into park and/or activating the parking brake via the user interface 106. In other examples, the user interface circuitry 304 can detect a parking event by any other suitable means.

At block 504, the sensor interface circuitry 302 can retrieve data from the sensors 208A, 208B, 208C, 208D, 210 and/or other sensors associated with the vehicle 100. In some examples, the sensor interface circuitry 302 can transform the received data from a machine-readable format (e.g., a voltage value, a current value, etc.) into a human-readable format (e.g., a string, a floating-point number, an integer, etc.).

At block 506, the brake determiner circuitry 310 determines if the operating settings of the vehicle 100 allow activation of a single one of the actuators 202A, 202B. For example, the brake determiner circuitry 310 can access a user preference from the user interface circuitry 304 and/or the braking system database 308. In some such examples, the user preference can be indicated if a user prefers to utilize both actuators 202A, 202B or would prefer to improve brake endurance by using a single one of the actuators 202A, 202B when vehicle condition permits. If the operating settings of the vehicle 100 allows activation of a single actuator, the operation 500 advances to block 508. If the operating settings of the vehicle do not allow the activation of a single actuator, the operation 500 advances to block 522.

At block 508, the vehicle condition determiner circuitry 306 determines a vehicle condition based on the sensor data. For example, the vehicle condition determiner circuitry 306 can determine the vehicle condition based on the sensor data accessed by the sensor interface circuitry 302. For example, the vehicle condition determiner circuitry 306 can determine the grade of a driving surface on which the vehicle 100 is disposed based on readings from the vehicle sensors 210 (e.g., accelerometer data, etc.). In some examples, the vehicle condition determiner circuitry 306 can output a binary value indicating whether it is permissible to use a single one of the actuators 202A, 202B to hold the vehicle 100. In other examples, the vehicle condition determiner circuitry 306 can output a value (e.g., an integer, a floating-point value, a string, etc.) indicative of the feasibility of using a single one of the actuators 202A, 202B to hold the vehicle 100.

At block 510, the brake determiner circuitry 310 determines if the vehicle condition allows the activation of a single actuator. For example, the brake determiner circuitry 310 can determine if the vehicle condition allows for activation of a single actuator based on the output of the vehicle condition determiner circuitry 306. In some examples, the brake determiner circuitry 310 can compare the output of the vehicle condition determiner circuitry 306 to a user-set threshold and/or a manufacturer-set threshold. If the brake determiner circuitry 310 determines the vehicle condition allows activation of a single actuator, the operation 500 advances to block 512. If the brake determiner circuitry 310 determines the vehicle condition does not allow activation of a single actuator, the process advances to block 522.

At block 512, the brake determiner circuitry 310 accesses a record of a preceding parking event to determine a previously activated actuator. For example, the brake determiner circuitry 310 can determine the actuator used in the immediately preceding parking event. In some examples, the brake determiner circuitry 310 can determine the previously activated actuator based on records of the previous parking event(s) stored in the braking system database 308. In other examples, the brake determiner circuitry 310 can determine the previously used brake by any other suitable means.

At block 514, the brake interface circuitry 314 activates the alternate actuator at an initial force based on the determined vehicle condition. For example, the brake interface circuitry 314 can cause one of the first actuator 202A and/or the second actuator 202B to activate (e.g., to cause a corresponding one of the calipers 204A, 204B to engage with a corresponding one of the rotors 206C, 206D at a holding force based on the vehicle condition, etc.). In such examples, the brake interface circuitry 314 causes the activation of one of the actuators 202A, 202B (e.g., engagement of the corresponding one of the brakes 201A, 201C, etc.) without the activation of the other one of the actuators 202A, 202B (e.g., without engagement of the corresponding one of the brakes 201A, 201C, etc.). In other examples, the brake interface circuitry 314 can cause the activation of the actuators 202A, 202B by any other suitable means.

At block 516, the brake determiner circuitry 310 can determine if wheel rotation is detected. For example, the brake determiner circuitry 310 can determine if one of the wheels 102A, 102B, 102C, 102D based on sensor data from the wheel sensors 208A, 208B, 208C, 208D. In other examples, the brake determiner circuitry 310 can determine if the wheels are rotating by any other suitable means. If the brake determiner circuitry 310 determines the wheels are not rotating, the operation 500 advances to block 518. In some such examples, the brake determiner circuitry 310 can monitor for wheel rotation for a set amount of time (e.g., a user-set time, a manufacturer-set time, etc.) and/or for a specific event (e.g., driver egress, etc.) before advancing to block 518. If the brake determiner circuitry 310 determines the wheels are rotating, the operation advances to block 522.

At block 518, the brake interface circuitry 314 increases the holding force margin based on vehicle sensor data and/or vehicle settings. For example, the brake interface circuitry 314 can increase the holding force of the activated actuator activation based on a predetermined margin (e.g., a user-set margin, a manufacturer-set margin, etc.). In other examples, the brake interface circuitry 314 can apply increase the initial holding force by any suitable value.

At block 520, the brake determiner circuitry 310 can determine if wheel rotation is detected. For example, the brake determiner circuitry 310 can determine if one of the wheels 102A, 102B, 102C, 102D based on sensor data from the wheel sensors 208A, 208B, 208C, 208D. In other examples, the brake determiner circuitry 310 can determine if the wheels are rotating by any other suitable means. If the brake determiner circuitry 310 determines the wheels are rotating, the operation 500 advances to block 522. If the brake determiner circuitry 310 determines the wheels are not rotating, the operation 500 ends. In other examples, block 520 can repeat until the vehicle 100 is transitioned from its parking mode to a mobile mode.

At block 522, the brake interface circuitry 314 activates both the of actuators 202A, 202B to thereby engage the corresponding brakes 201C, 201D. For example, the brake interface circuitry 314 can transmit a signal to cause the activation of the first actuator 202A and the second actuator 202B. The operation 500 ends.

FIG. 6 is a flowchart representative of example machine readable instructions and/or example operations 600 that may be executed and/or instantiated by processor circuitry to implement the braking controller 200 to prevent rotor warping. The machine readable instructions and/or operations 600 of FIG. 6 begin at block 602, at which the user interface circuitry 304 detects a parking event. For example, the user interface circuitry 304 can detect a parking event based on a user input to the user interface 106. For example, the user interface circuitry 304 can detect a parking event triggered by a user shifting the vehicle into park and/or activating the parking brake via the user interface 106. In other examples, the user interface circuitry 304 can detect a parking event by any other suitable means.

At block 604, the sensor interface circuitry 302 can retrieve data from the sensors 208A, 208B, 208C, 208D, 210 and/or other sensors associated with the vehicle 100. In some examples, the sensor interface circuitry 302 can transform the received data from a machine-readable format (e.g., a voltage value, a current value, etc.) into a human-readable format (e.g., a string, a floating-point number, an integer, etc.).

At block 606, the threshold comparator circuitry 312 determines if the brake temperature satisfies a temperature threshold. For example, the threshold comparator circuitry 312 can determine if the temperature of one or more of the brakes 201A, 201B, 201C, 201D satisfies a temperature threshold. In some examples, the temperature threshold can be based on a temperature at which activation of the calipers 204A, 204B, 204C, 204D could cause the rotors 206A, 206B, 206C, 206D to warp. In other examples, the temperature threshold can be based on any other suitable criteria. If the threshold comparator circuitry 312 determines the brake temperature satisfies the threshold, the operation 600 advances to block 608. If the threshold comparator circuitry 312 determines the brake temperature does not satisfy the temperature threshold, the operation 600 advances to block 616.

At block 608, the brake interface circuitry 314 activate the first actuator 202A to engage the corresponding brake 201C for a first duration. For example, the brake determiner circuitry 310 can cause the first actuator 202A to actuate such that the third caliper 204C engages the third rotor 206C. In other examples, the brake determiner circuitry 310 can cause a different actuator of the vehicle 100 (e.g., the second actuator 202B, etc.) to activate. In some examples, the first duration corresponds to an amount of time that minimizes the potential warping of the rotor 206A. In other examples, the first duration can be based on any suitable metric.

At block 610, the brake interface circuitry 314 activates the second actuator 202B to engage the corresponding brake 201D. For example, the brake determiner circuitry 310 can cause the first actuator 202A to activate such that the third caliper 204C engages the third rotor 206C. At block 612, the brake interface circuitry 314 deactivates the first actuator 202A to thereby disengage the corresponding brake 201C. For example, the brake determiner circuitry 310 can cause the first actuator 202A to actuate such that the third caliper 204C disengages the third rotor 206C. In some examples, the deactivation of the first actuator 202A is completed after the activation of the second actuator 202B (e.g., half a second after the activation of the second actuator 202B, 1 second after the activation of the second actuator 202B, etc.). In other examples, the execution of block 612 and the execution of block 610 occur substantially simultaneously.

At block 614, the brake interface circuitry 314 maintains activation of the second actuator 202B for a second duration. In some examples, the second duration corresponds to an amount of time that minimizes the potential warping of the rotor 206D. In some examples, the first duration can be substantially equal to the second duration. In other examples, the first duration and the second duration can be different. In other examples, the second duration can be based on any suitable metric. In some examples, the first duration and the second duration overlap (e.g., such that the beginning of the second duration occurs before the ending of the first duration, etc.). In other examples, the first duration and second duration can occur sequentially. The operation 600 returns to block 606.

At block 616, the brake interface circuitry 314 activates the actuators 202A, 202B and/or engages the brakes 201C, 201D in accordance with normal vehicle operation. For example, the brake interface circuitry 314 can cause the actuators 202A, 202B to activate in accordance with the operation 500 of FIG. 5 (e.g., and corresponding engagement of the brakes 201C, 201D, etc.). In other examples, the brake interface circuitry 314 can cause the actuators 202A, 202B and/or calipers 204A, 204B, 204C, 204D to activate in any other suitable means. The operation 600 ends.

Figure 7:
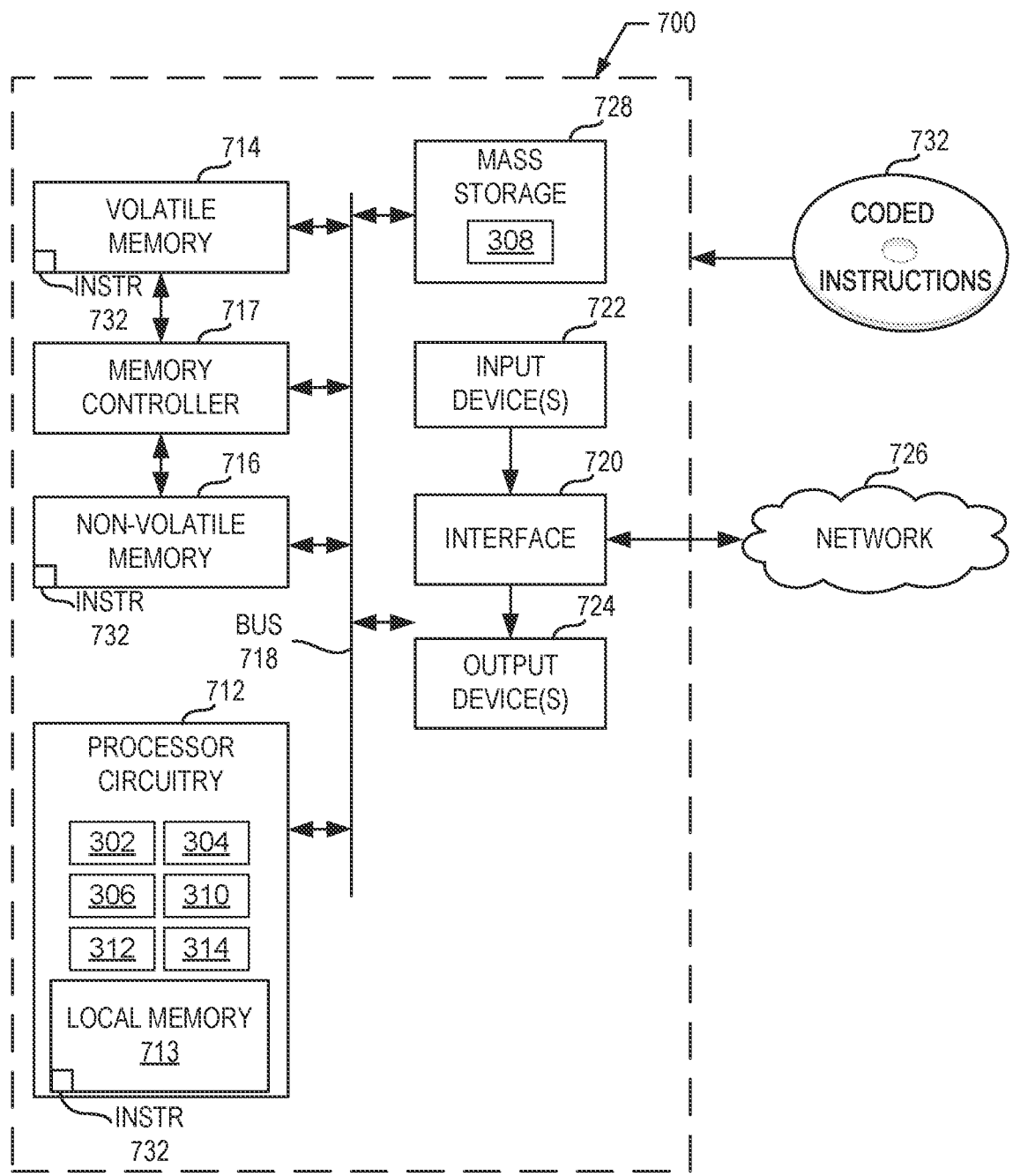
FIG. 7 is a block diagram of an example processing platform including processor circuitry structured to execute the example machine readable instructions of FIGS. 5-6 to implement the braking controller of FIGS. 2 and 3.

FIG. 7 is a block diagram of an example processor platform 700 structured to execute and/or instantiate the machine readable instructions and/or operations of FIGS. 5 and 6 to implement the braking controller 200 of FIGS. 2 and 3. The processor platform 700 can be, for example, a server, a personal computer, a workstation, a self-learning machine (e.g., a neural network), a mobile device (e.g., a cell phone, a smart phone, a tablet such as an IPad™), a personal digital assistant (PDA), an Internet appliance, a DVD player, a CD player, a digital video recorder, a Blu-ray player, a gaming console, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the sensor interface circuitry 302, the user interface circuitry 304, the vehicle condition determiner circuitry 306, the brake determiner circuitry 310, the threshold comparator circuitry 312, and the brake interface circuitry 314.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output devices 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 732, which may be implemented by the machine readable instructions of FIGS. 5 and 6, may be stored in the mass storage device 728, in the volatile memory 714, in the non-volatile memory 716, and/or on a removable non-transitory computer readable storage medium such as a CD or DVD.

Figure 8:
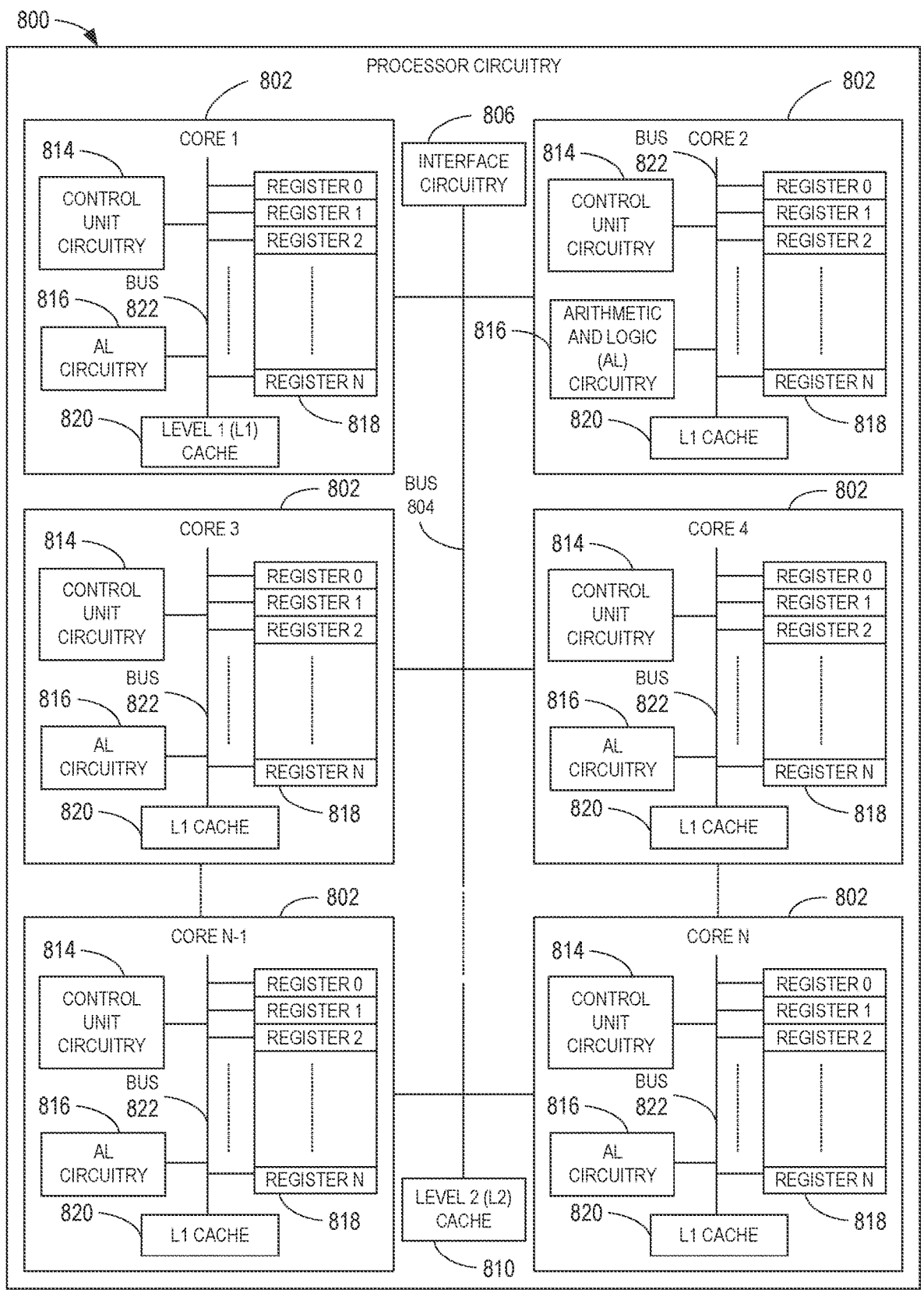
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a microprocessor 800. For example, the microprocessor 800 may implement multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowcharts of FIGS. 5 and 6.

The cores 802 may communicate by an example bus 804. In some examples, the bus 804 may implement a communication bus to effectuate communication associated with one(s) of the cores 802. For example, the bus 804 may implement at least one of an Inter-Integrated Circuit (I2C) bus, a Serial Peripheral Interface (SPI) bus, a PCI bus, or a PCIe bus. Additionally or alternatively, the bus 804 may implement any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2_cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the L1 cache 820, and an example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The bus 822 may implement at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
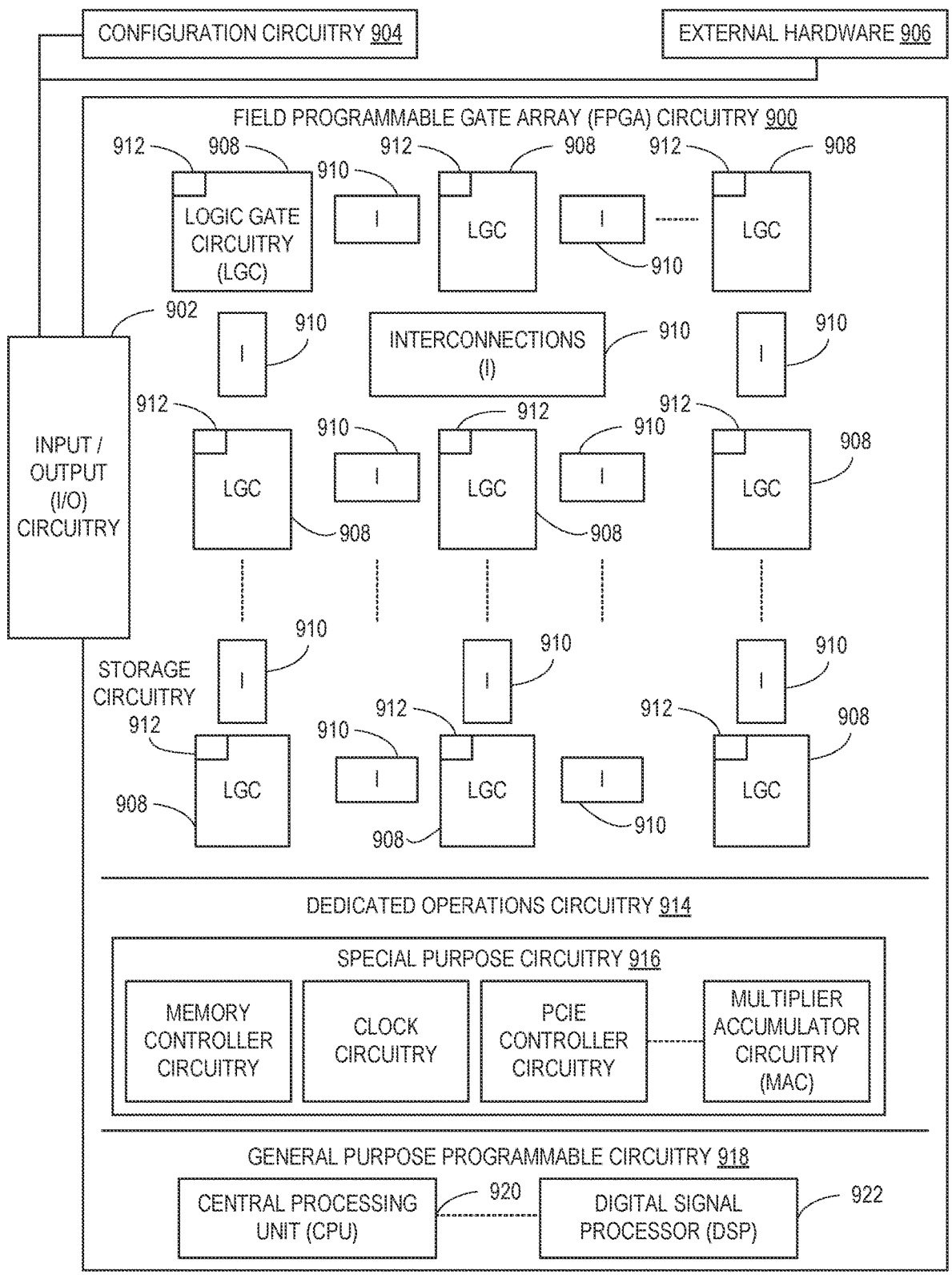
FIG. 9 is a block diagram of another example implementation of the processor circuitry of FIG. 8.

FIG. 9 is a block diagram of another example implementation of the processor circuitry 712 of FIG. 7. In this example, the processor circuitry 712 is implemented by FPGA circuitry 900. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowcharts of FIGS. 5 and 6 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowcharts of FIGS. 5 and 6. In particular, the FPGA 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowcharts of FIGS. 5 and 6. As such, the FPGA circuitry 900 may be structured to effectively instantiate some or all of the machine readable instructions of the flowchart of FIGS. 5 and 6 as dedicated logic circuits to perform the operations corresponding to those software instructions in a dedicated manner analogous to an ASIC. Therefore, the FPGA circuitry 900 may perform the operations corresponding to the some or all of the machine readable instructions of FIGS. 5 and 6 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware (e.g., external hardware circuitry) 906. For example, the configuration circuitry 904 may implement interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may implement the microprocessor 800 of FIG. 8. The FPGA circuitry 900 also includes an array of example logic gate circuitry 908, a plurality of example configurable interconnections 910, and example storage circuitry 912. The logic gate circuitry 908 and interconnections 910 are configurable to instantiate one or more operations that may correspond to at least some of the machine readable instructions of FIGS. 5 and 6 and/or other desired operations. The logic gate circuitry 908 shown in FIG. 6 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 6 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an onboard CPU, such as one or more of the example CPU 920 of FIG. 9. Therefore, the processor circuitry 712 of FIG. 8 may additionally be implemented by combining the example microprocessor 800 of FIG. 8 and the example FPGA circuitry 900 of FIG. 9. In some such hybrid examples, a first portion of the machine readable instructions represented by the flowchart of FIGS. 5-6 may be executed by one or more of the cores 802 of FIG. 8 and a second portion of the machine readable instructions represented by the flowcharts of FIGS. 5 and 6 may be executed by the FPGA circuitry 900 of FIG. 9.

In some examples, the processor circuitry 712 of FIG. 7 may be in one or more packages. For example, the processor circuitry 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

Example methods, apparatus, systems, and articles of manufacture to methods and apparatus to extend brake life cycle are disclosed herein. Further examples and combinations thereof include the following:

Example 1 includes a vehicle comprising a first brake associated with a first wheel of the vehicle, a second brake associated with a second wheel of the vehicle, memory, and a brake controller to execute instructions to detect a first parking event, determine, via a first sensor, a condition of the vehicle, access, from the memory, a record of a second parking event including an activation of the first brake, the second parking event preceding the first parking event, and in response to determining the condition satisfies a threshold, engage the second brake without engaging the first brake.

Example 2 includes the vehicle of example 1, wherein the first wheel is a driver-side wheel, and the second wheel is a passenger-side wheel.

Example 3 includes the vehicle of example 1, wherein the condition includes a grade of a driving surface on which the vehicle is located.

Example 4 includes the vehicle of example 1, wherein the brake controller executes the instructions to engage the second brake without engaging the first brake by determining a holding force based on the condition, the holding force corresponding to a sum of a first force sufficient to prevent the vehicle from moving and a safety margin, and engaging the second brake at the holding force.

Example 5 includes the vehicle of example 1, wherein the brake controller executes instructions to detect, via a second sensor, a rotation of at least one of the first wheel or the second wheel, and in response to detecting the rotation of the at least one of the first wheel or the second wheel, engage the first brake.

Example 6 includes the vehicle of example 1, wherein the condition includes a user input indicating at least one of (1) a preference to engage the first brake and the second brake of the vehicle, or (2) a preference to minimize use of the first brake and the second brake.

Example 7 includes the vehicle of example 1, wherein the first sensor includes an accelerometer associated with a safety system of the vehicle.

Example 8 includes a non-transitory computer readable medium comprising instructions, which, when executed cause a processor to detect a first parking event of a vehicle, determine, via a first sensor, a condition of the vehicle, access a record of a second parking event including an activation a first brake of the vehicle, the second parking event preceding the first parking event, and in response to determining the condition satisfies a threshold, engage a second brake without engaging the first brake.

Example 9 includes the non-transitory computer readable medium of example 8, wherein the first brake is associated with a driver-side wheel of the vehicle and the second brake is associated with a passenger-side wheel of the vehicle.

Example 10 includes the non-transitory computer readable medium of example 8, wherein the condition includes a grade of a driving surface on which the vehicle is located.

Example 11 includes the non-transitory computer readable medium of example 8, wherein the instructions, when executed, cause a processor to engage the second brake without engaging the first brake by determining a holding force based on the condition, the holding force corresponding to a sum of a first force sufficient to prevent the vehicle from moving and a safety margin, and engaging the second brake at the holding force.

Example 12 includes the non-transitory computer readable medium of example 8, wherein the instructions, when executed, cause a processor to detect, via a second sensor, a rotation of a wheel of the vehicle, and in response to detecting the rotation, engage the first brake.

Example 13 includes the non-transitory computer readable medium of example 8, wherein the condition includes a user input indicating at least one of (1) a preference to engage the first brake and the second brake of the vehicle, or (2) a preference to minimize use of the first brake and the second brake.

Example 14 includes the non-transitory computer readable medium of example 8, wherein the first sensor includes an accelerometer associated with a safety system of the vehicle.

Example 15 includes a method comprising detecting a first parking event of a vehicle, determining, via a first sensor, a condition of the vehicle, accessing a record of a second parking event including an activation a first brake of the vehicle, the second parking event preceding the first parking event, and in response to determining the condition satisfies a threshold, engaging a second brake without engaging the first brake.

Example 16 includes the method of example 15, wherein the first brake is associated with a driver-side wheel of the vehicle and the second brake is associated with a passenger-side wheel of the vehicle.

Example 17 includes the method of example 15, wherein the condition includes a grade of a driving surface the vehicle.

Example 18 includes the method of example 15, wherein the engaging of the second brake without engaging the first brake includes determining a holding force based on the condition, the holding force corresponding to a sum of a first force sufficient to prevent the vehicle from moving and a safety margin, and engaging the second brake at the holding force.

Example 19 includes the method of example 15, including detecting, via a second sensor, a rotation of a wheel of the vehicle, and in response to detecting the rotation, engaging the first brake.

Example 20 includes the method of example 15, wherein the condition includes a user input indicating at least one of (1) a preference to engage the first brake and the second brake of the vehicle, or (2) a preference to minimize use of the first brake and the second brake.

Example 21 includes a vehicle comprising a first brake associated with a first wheel of the vehicle, a second brake associated with a second wheel of the vehicle, memory, and a brake controller to execute instructions to detect a first parking event, compare a temperature of at least one of the first brake or the second brake to a temperature threshold, in response to determining the at least one temperature satisfies the threshold engaging the first brake for a first duration, disengaging the first brake after a first duration, and engaging the second brake for a second duration, the second duration beginning before the first duration ends.

Example 22 includes the vehicle of example 21, wherein the first wheel is a driver-side wheel and the second wheel is a passenger-side wheel.

Example 23 includes the vehicle of example 21, wherein the brake controller executes the instructions to, in response to determining the at least one temperature does not satisfy the threshold, engage the first brake and the second brake.

Example 24 includes the vehicle of example 21, wherein the temperature threshold corresponds to a warping temperature of a rotor of the first brake.

Example 25 includes the vehicle of example 21, the brake controller to executes the instructions to detect the first parking event by detecting a user input, the user input including at least one of (1) activating a parking brake of the vehicle or (2) shifting a transmission of the vehicle into park.

Example 26 includes the vehicle of example 21, further including an electric parking brake system, the electric parking brake system including the first brake and the second brake. The following claims are hereby incorporated into this Detailed Description by this reference, with each claim standing on its own as a separate embodiment of the present disclosure.

What is claimed is:

1. A vehicle comprising:
a first brake associated with a first wheel of the vehicle;
a second brake associated with a second wheel of the vehicle;
memory; and
a brake controller to execute instructions to:
  detect a parking event;
  determine, via a first sensor, a condition of the vehicle;
  determine a first holding force based on the condition in response to determining the condition satisfies a threshold;
  engage the second brake at the first holding force, the second brake engaged without engaging the first brake;
  detect, via a second sensor, a rotation of at least one of the first wheel or the second wheel during the engaging the second brake at the first holding force without engaging the first brake; and
  engage the second brake at a second holding force greater than the first holding force in response to the detected rotation of the at least one of the first wheel or the second wheel, the second brake engaged at the second holding force without engaging the first brake.

2. The vehicle of claim 1, wherein the condition includes a grade of a driving surface on which the vehicle is located.

3. The vehicle of claim 1, wherein the brake controller executes the instructions to determine the first holding force based on a sum of a first force sufficient to prevent the vehicle from moving and a safety margin.

4. The vehicle of claim 1, wherein the rotation is a first rotation and the brake controller executes instructions, after engaging the second brake at the second holding force, to:
  detect, via the second sensor, a second rotation of at least one of the first wheel or the second wheel; and
  after detecting the second rotation of the at least one of the first wheel or the second wheel, engage the first brake.

5. The vehicle of claim 1, wherein the condition includes a user input indicating at least one of (1) a preference to engage the first brake and the second brake of the vehicle, or (2) a preference to minimize use of the first brake and the second brake.

6. The vehicle of claim 1, wherein the first sensor includes an accelerometer associated with a safety system of the vehicle.

7. The vehicle of claim 1, wherein the condition includes at least one of a temperature of the second wheel or a wind experienced by the vehicle.

8. A non-transitory computer readable medium comprising instructions, which, when executed cause a processor to:
  detect a parking event of a vehicle;
  determine, via a first sensor, a condition of the vehicle;
  determine a first holding force based on the condition in response to determining the condition satisfies a threshold;
  engage a second brake of the vehicle at the first holding force, the second brake engaged without engaging a first brake of the vehicle;
  detect, via a second sensor, a rotation of a wheel of the vehicle during the engaging the second brake at the first holding force without engaging the first brake; and
  engage the second brake at a second holding force greater than the first holding force in response to the detected rotation of the wheel, the second brake engaged at the second holding force without engaging the first brake.

9. The non-transitory computer readable medium of claim 8, wherein the wheel is a driver-side wheel, the first brake is associated with the driver-side wheel of the vehicle and the second brake is associated with a passenger-side wheel of the vehicle.

10. The non-transitory computer readable medium of claim 8, wherein the condition includes a grade of a driving surface on which the vehicle is located.

11. The non-transitory computer readable medium of claim 8, wherein the instructions, when executed, cause the processor to determine the first holding force based on a sum of a first force sufficient to prevent the vehicle from moving and a safety margin.

12. The non-transitory computer readable medium of claim 8, wherein the rotation is a first rotation and the instructions, when executed, cause the processor, after engaging the second brake at the second holding force, to:
  detect, via the second sensor, a second rotation of the wheel of the vehicle; and
  after detecting the second rotation, engage the first brake.

13. The non-transitory computer readable medium of claim 8, wherein the condition includes a user input indicating at least one of (1) a preference to engage the first brake and the second brake of the vehicle, or (2) a preference to minimize use of the first brake and the second brake.

14. The non-transitory computer readable medium of claim 8, wherein the first sensor includes an accelerometer associated with a safety system of the vehicle.

15. A method comprising:
   detecting a parking event of a vehicle;
   determining, via a first sensor, a condition of the vehicle;
   determining the condition satisfies a threshold;
   determining a first holding force based on the condition in response to determining the condition satisfies the threshold;
   engaging a second brake of the vehicle at the first holding force, the second brake engaged without engaging a first brake of the vehicle;
   detecting, via a second sensor, a rotation of a wheel of the vehicle during the engaging the second brake at the first holding force without engaging the first brake; and
   engaging the second brake at a second holding force greater than the first holding force in response to the detected rotation of the wheel, the second brake engaged at the second holding force without engaging the first brake.

16. The method of claim 15, wherein the wheel is a driver-side wheel, the first brake is associated with the driver-side wheel of the vehicle and the second brake is associated with a passenger-side wheel of the vehicle.

17. The method of claim 15, wherein the condition includes a grade of a driving surface the vehicle.

18. The method of claim 15, wherein the
   determining the first holding force is based on a sum of a first force sufficient to prevent the vehicle from moving and a safety margin.

19. The method of claim 15, wherein the rotation is a first rotation and the method further including:
   detecting, via the second sensor, a second rotation of the wheel of the vehicle; and
   after detecting the second rotation, engaging the first brake.

20. The method of claim 15, wherein the condition includes a user input indicating at least one of (1) a preference to engage the first brake and the second brake of the vehicle, or (2) a preference to minimize use of the first brake and the second brake.

* * * * *